United States Patent [19]

Thorne

[11] Patent Number: 4,507,890

[45] Date of Patent: Apr. 2, 1985

[54] FISHING ROD INDICATOR

[76] Inventor: Keith Thorne, 7110 North Milford Rd., Holly, Mich. 48442

[21] Appl. No.: 553,377

[22] Filed: Nov. 21, 1983

[51] Int. Cl.³ .................................................. A01K 97/12
[52] U.S. Cl. ......................................................... 43/17
[58] Field of Search ...................... 43/17, 24, 25, 16, 15

[56] References Cited

U.S. PATENT DOCUMENTS

| | | | |
|---|---|---|---|
| 1,576,233 | 3/1926 | Cook. | |
| 1,847,798 | 3/1932 | Wark | 43/17 |
| 2,409,988 | 10/1946 | Schwebs | 43/17 |
| 2,910,797 | 11/1959 | Cucuro | 43/17 |
| 3,143,822 | 8/1964 | Schooley | 43/17 |
| 3,238,659 | 3/1966 | Lamb | 43/17 |
| 3,364,610 | 1/1968 | Poole | 43/17 |
| 3,571,536 | 3/1971 | Sparks | 200/60 |
| 3,696,546 | 10/1972 | Ambrose | 43/17 |
| 3,820,268 | 6/1974 | Newton | 43/17 |
| 3,846,929 | 11/1974 | McBride | 43/17 |
| 3,916,554 | 11/1975 | Hullett | 43/17 |
| 4,027,419 | 6/1977 | Popeil | 43/18 R |
| 4,276,711 | 7/1981 | Mathauser | 43/17 |

Primary Examiner—Gene P. Crosby
Attorney, Agent, or Firm—Basile, Weintraub & Hanlon

[57] ABSTRACT

A fishing rod is disclosed as comprising a handle having a rod portion extending from one end thereof. The extended end of the rod portion is provided with a movable electrical contact which carries a fishing line. The contact is responsive to the presence of a fish on the line for closing an electrical circuit which, in turn, is adapted to actuate a signaling device disposed in the handle of the fishing rod to indicate to the fisherman when a fish is tampering, or otherwise biting, the bait at the end of the fishing line.

1 Claim, 3 Drawing Figures

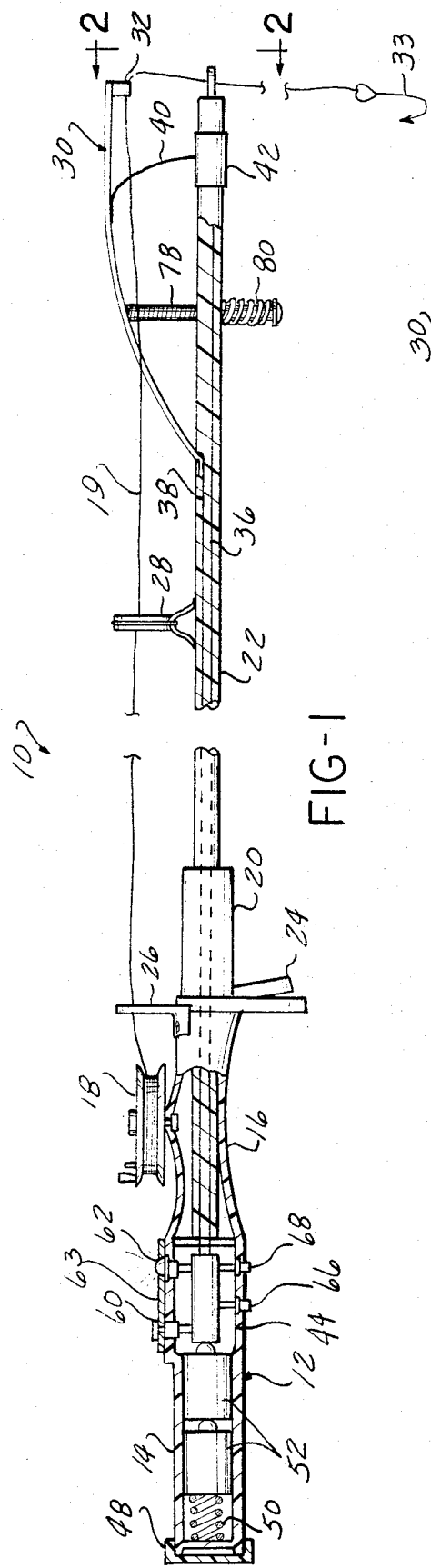
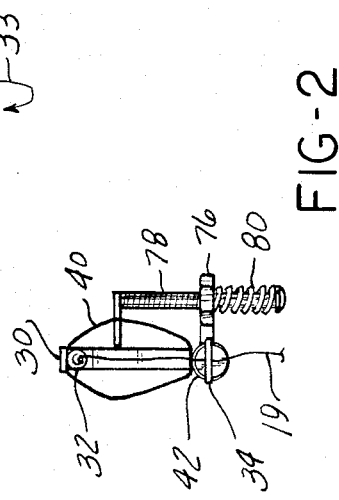
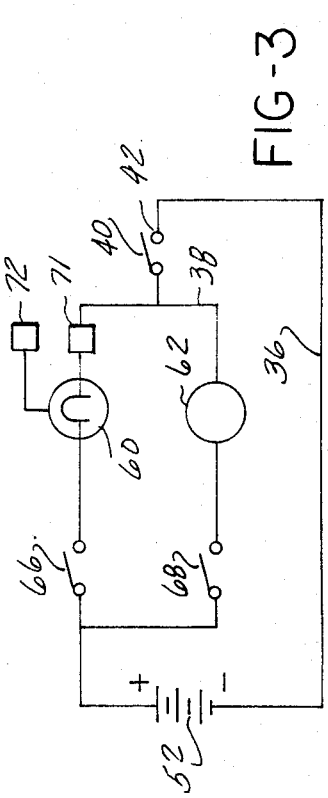
FIG-1
FIG-2
FIG-3

FISHING ROD INDICATOR

BACKGROUND OF THE INVENTION

I. Field of the Invention

The present invention relates to fishing rods and, more particularly, to a fishing rod having an indicating device for signaling the presence of a fish which is tampering with or has bitten at the bait at the end of the fishing line.

II. Description of the Prior Art

Heretofore, numerous devices and apparatuses have been devised for providing fishermen with a means for ascertaining the presence of a fish at the end of the fishing line. Examples of such known devices are disclosed in U.S. Pat. Nos. 1,576,233; 3,143,822; 3,846,929; 4,027,419; 3,820,268; 3,916,554; 3,571,536; 3,364,610; 2,910,797; 3,696,546; 1,847,798 and 2,409,988. While each of the aforementioned patents discloses fishing rod indicators and similar signaling devices, none function in the unique manner as Applicant's invention, nor are any constructed in the simple and efficient manner as the present invention.

SUMMARY OF THE INVENTION

The present invention, which will be described subsequently in greater detail, comprises an indicator for a fishing rod. The rod has a handle and a rod portion with one end thereof carried by the handle. The rod portion has an extended end on which is mounted a fixed line guide and a movable line guide adjacent to the fixed line guide. A reel carried by the handle has a line passing from the reel, respectively, through the movable and fixed line guides and is adapted to be positioned in the water with a hook and bait at the end thereof. When a fish tampers with, or otherwise bites, at the bait at the end of the fishing line, the movable guide means is brought into a position in close proximity to the fixed guide to make an electrical contact. The contact is adapted to actuate a signal means which provides an audible and/or visual signal of the presence of the fish at the end of the line.

It is therefore an object of the present invention to provide a new and improved fishing rod indicator for a fishing rod wherein the presence of a fish at the end of the line is indicated selectively by the flashing of a lamp or the sound of a buzzer mounted on the rod handle.

It is a further object of the present invention to provide such a fishing rod indicator wherein a very simple means is provided to obtain a positive actuation of the signaling means in response to the presence of a fish on the end of the fishing line.

Other objects, advantages and applications of the present invention will become apparent to those skilled in the art of fishing rod indicators when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views and wherein:

FIG. 1 is a longitudinal, partially sectioned view of a fishing rod incorporating an indicator constructed in accordance with the principles of the present invention;

FIG. 2 is a fragmentary, partially sectioned view as seen from line 2—2 of FIG. 1; and FIG. 3 is a schematic, electrical diagram of one example of an electrical circuit employed in the fishing rod indicator of the present invention.

DESCRIPTION OF THE PREFERRED EMBODIMENT

Referring now to the drawing and in particular to FIG. 1, there is illustrated one example of the present invention in the form of a fishing rod 10 comprising a handle 12 and a rod portion 22 extending therefrom. The handle 12 has a rear gripping portion 14 which houses the signaling apparatus of the present invention, all of which will be described in greater detail hereinafter. An intermediate portion 16 of the handle 12 is adapted to mount a conventional reel 18 which, in turn, has a fishing line 19 wound thereabout in a conventional manner. The forward end portion 20 of the handle 12 functions to securely attach the end of the fishing rod portion 22 to the handle 12 such that the handle 12 and the rod portion 22 function as an integral unit and are used in the conventional manner. The forward end portion 20 of the handle 12 mounts a support member 24 which permits the fishing rod 10 to be positioned on the ground in a supportive fashion. The upper surface of the forward end portion 20 of the handle 12 mounts a rear line guide 26, which is longitudinally aligned with a plurality of intermediate line guides (only one of which is shown at 28) disposed along the length of the rod portion 22, the rear line guide 26 and intermediate line guides 28 being adapted to receive and guide the fishing line 19 therethrough in a conventional fashion. At the forward end of the rod portion 22 there is provided a flexible member 30 which is movable toward and away from the end of the rod portion 22 and on which there is mounted a movable line guide 32. The forward end of the rod portion 22 mounts a forward fixed line guide 34. The fishing line extends through the last intermediate line guide 28 and, respectively, through the movable line guide 32 and the forward fixed line guide 34, whereupon the fishing line extends into the water and a suitable bait on hook 33 at the end thereof functions in a conventional manner to lure the fish. It can be seen that when a fish does tamper with, or otherwise engage, the fishing hook, a tension on the fishing line 19 will cause the flexible member 30 to move downwardly toward the forward line guide 34. The movable member 30 is of a very flexible design adapted to move under the slightest tension exerted on the fishing line 19.

The fishing rod portion 22 is formed with a pair of electrical wires 36 and 38 extending therethrough. The wire 38 extends along the bottom surface of the flexible member 30 and terminates at a movable electrical contact 40, while the wire 36 extends through the rod portion 22 and terminates in a fixed electrical contact 42. The wires 36 and 38 extend completely through the rod portion 22 and terminate in an electrical junction box 44 disposed in the rear gripping portion 14 of the handle 12. The movable contact 40 is formed of a flexible material such that its configuration can be altered so as to adjustably vary the spacing between the same and the contact 42 when the movable member 30 is in a relaxed position, whereby the distance traveled by the movable member 30 before the contact 40 engages the contact 42 can be selectively varied.

As can best be seen from the left end portion of FIG. 1, the rear gripping portion 14 of the handle 12 is hollowed out and access to the interior thereof is by means of a removable cap 48, which threadingly engages the open end of the rear gripping portion 14. The removable cap 48 mounts a coil spring 50 which exerts a bias against a pair of longitudinally disposed batteries 52 to urge them against an electrical contact formed at the end of the electrical junction box 44.

The upper portion of the rear gripping portion 14 has a plurality of apertures which, respectively, mount a buzzer 60 and a light 62. A suitable clamping mechanism 63 overlying the buzzer 60 and light 62 secures the same to the rear gripping portion 14 of the handle 12. The lower side of the rear gripping portion 14 has a plurality of spaced apertures which, respectively, mount a buzzer switch 66 and light switch 68. Appropriate wiring disposed in the interior of the rear gripping portion 14 connects the batteries 52, the wires 36 and 38, the buzzer 60, the light 62 and switches 66 and 68 in a manner which will be descibed hereinafter with respect to the electric circuit illustrated in FIG. 3 of the drawing.

As can best be seen in FIG. 3 of the drawing, the electric circuit comprises the batteries 52, which are connected in parallel to the buzzer switch 66 and light switch 68. The buzzer switch 66 and light switch 68 are, in turn, connected in series, respectively, to the buzzer 60 and light 62. The buzzer 60 and light 62 are, in turn, connected by means of wire 38 extending through the rod portion 22 and the flexible member 30 to the movable contact 40. The fixed contact 42 is connectable via wire 36 to the batteries 52. It can thus be seen that if the buzzer switch 66 is placed in a closed position connecting the buzzer 60 to the battery 52, when a fish contacts the fishing hook 33 and exerts a tension on the line 19 causing the movable guide 32 to move in close proximity to the fixed guide 34, the movable contact 40 will engage the fixed contact 42, closing the circuit between the battery 52 and the buzzer 60 to actuate the same and provide a signal to the fisherman that the fishing line 19 is being disturbed by a fish.

In the same manner, if the buzzer switch 66 is opened and the light switch 68 is, in turn, closed, contact between the movable contact 40 and the fixed contact 42 will close the circuit connecting the light 62 to the batteries 52, thereby actuating the same and giving a visual indication to the fisherman that a fish is tampering with the bait at the end of the fishing line. The closing of both the buzzer switch 66 and the light switch 62 will provide both a visual and an audio signal to the fisherman that a fish is tampering with the bait. A rheostat 71 can be provided in series with the buzzer 60 so as to control the volume thereof. Additionally, an appropriate external ear plug 72 may be used to provide the audio signal directly to the fisherman.

As can best be seen in FIGS. 1 and 2, the rod 22 carries a bracket 76 which includes a threaded bore that receives a threaded member 78, the upper end of which engages a flange member carried by and movable with the member 30. It can be seen that when the member 78 is threaded upwardly, the flexible member 30 is raised and both the distance the member 30 has to be moved and the amount of tension required to move the member 30 are variably increased. In a like manner, lowering the threaded member 78 achieves the opposite results. Spring 80 ensures that the member 78 remains in the desired position.

It can thus be seen that the present invention has provided a new and improved fishing rod indicator which is simple in its design, yet one which is economical to manufacture and reliable and efficient in operation.

It should be understood by those skilled in the art of fishing rod indicators that other forms of the present invention may be had, all coming within the spirit of the invention and scope of the appended claim.

What is claimed is as follows:

1. A fishing rod indicator comprising:

a handle;

a rod portion having one end carried by said handle, said rod portion having a fixed line guide at its other end;

said rod portion further having a movable member affixed at said other end, said movable member being positioned vertically above said other end of said rod portion and carrying a movable line guide spaced from said fixed line guide;

a reel having a line carried thereby, said reel being mounted on said handle, said line passing from said reel and respectively through said movable and fixed line guides, said movable member and movable line guide being brought from a first, spaced position to a second position which is nearer to said fixed guide when a tension is exerted on said line;

a first electrical contact means carried by said movable member and movable therewith;

a second electrical contact carried by said rod and being engaged by said first movable contact when said movable member is moved toward said fixed guide;

said first electrical contact means being formed of a flexible material such that its configuration can be altered so as to adjustably vary the spacing between said first and second contact means when said movable member is in said first position, whereby the distance traveled by said movable member before contact is made between said electrical contacts can be selectively varied;

a pair of electrical conductors extending through said rod portion and said movable portion and terminating in said first and second electrical contact means;

signal means carried by said handle and connected to said electrical conductors, said signal means adapted to be energized in response to said contact between said first and second electrical contact means; and means disposed between said movable member and said handle for selectively varying said first spaced position whereby the amount of tension required to cause said movable contact to engage said fixed contact is variable.

* * * * *